United States Patent
Xu et al.

(10) Patent No.: US 10,202,027 B2
(45) Date of Patent: Feb. 12, 2019

(54) REAR VIEW MIRROR PROTECTIVE COVER

(71) Applicants: Hong Xu, Shenzhen (CN); Jimmy Wan, Shenzhen (CN)

(72) Inventors: Hong Xu, Shenzhen (CN); Jimmy Wan, Shenzhen (CN)

(*) Notice: Subject to any disclaimer, the term of this patent is extended or adjusted under 35 U.S.C. 154(b) by 0 days.

(21) Appl. No.: 15/218,414

(22) Filed: Jul. 25, 2016

(65) Prior Publication Data

US 2017/0129321 A1    May 11, 2017

Related U.S. Application Data

(63) Continuation-in-part of application No. 13/063,903, filed as application No. PCT/CN2009/073447 on Aug. 24, 2009, now abandoned.

(30) Foreign Application Priority Data

Sep. 12, 2008 (CN) .......................... 2008 1 0149599

(51) Int. Cl.
    *B60J 11/06*    (2006.01)

(52) U.S. Cl.
    CPC ........... *B60J 11/06* (2013.01); *B60Y 2304/05* (2013.01)

(58) Field of Classification Search
    CPC .......................... B60J 11/06; B60Y 2304/05
    USPC ................................................ 150/154, 166
    See application file for complete search history.

(56) References Cited

U.S. PATENT DOCUMENTS

| D435,344 S | * | 12/2000 | Harrison | ...................... D12/188 |
| 6,467,918 B2 | * | 10/2002 | Strode | ...................... B60R 1/12 |
| | | | | 359/871 |
| D537,248 S | * | 2/2007 | Schlegel | ...................... D3/299 |

FOREIGN PATENT DOCUMENTS

| CN | 2481570 Y | 3/2002 |
| CN | 2772897 Y | 4/2006 |
| CN | 201049609 Y | 4/2008 |
| DE | 20219490 | 4/2003 |
| WO | WO9846452 | 10/1998 |

OTHER PUBLICATIONS

The State Intellectual Property Office, The P.R. China (SIPO), International Search Report for international patent application PCT/CN2009/73447, dated Oct. 15, 2009, pp. 1-5, SIPO.

* cited by examiner

*Primary Examiner* — Tri Mai

(74) *Attorney, Agent, or Firm* — Carmichael & Co.; Nevin Stuart Carmichael

(57) ABSTRACT

An external rear view mirror protective cover including a main body made of an elastic material and a trimmed edge arranged at one end of the main body that is folded towards an inside surface of main body. Another end of the main body opposite to the trimmed edge is in the shape of a circular arc. The main body includes a mirror opening, also formed with a trimmed edge, that is arranged to accommodate a rear view mirror. Securing bands are arranged on the trimmed edge. The elastic material is nylon, lycra or latex. The mirror opening is square or elliptic in shape. The protective cover is suitable for various kinds of rear view mirror due to its use of elastic material. The trimmed edge can effectively prevent the cover from sliding from the rear view mirror. The cover can effectively protect the external (Continued)

rear view mirror from external scuffing and damage caused by collision.

5 Claims, 2 Drawing Sheets

REAR VIEW MIRROR PROTECTIVE COVER

FIELD OF THE INVENTION

The invention relates to a protective cover, in particular to an external rear view mirror protective cover.

BACKGROUND OF THE INVENTION

The current design of external rear view mirrors with which various types of vehicles are equipped provides an external rear view mirror that extends outwardly from each vehicle body and, thus, is easily scraped. To avoid this problem, a protective cover is mounted on the external rear view mirror to prevent the scraping thereof.

Current protective covers are mainly formed in three forms: 1) a hard shell housing having a fixed shape, 2) an adhesive film, and 3) a fabric cover. Each of the foregoing protective cover forms has disadvantages. For the hard shell housing having a fixed shape, because different types of vehicles have different rear view mirrors, a custom designed mold is necessary for each type of external rear view mirror, resulting in a high production cost, difficulty in mounting and removing, and a lack of universality. For the adhesive, because the surface of the external rear view mirror housing is generally of an arc shape, the adhesive film may be poorly attached to the mirror surface resulting in a rough surface and stains which are difficultly removed may be left on the mirror housing surface after the adhesive film is removed. For the fabric cover, a special paper pattern and a special cut are required for each type of external rear view mirror. Due to the lack of the universality, one protective cover cannot match with external rear view mirrors having various sizes and, further, it may even cover a portion of a mirror surface, resulting in a potential safety problem.

In sum, all of the foregoing protective cover design solutions have the disadvantage of lacking the universality.

SUMMARY OF THE INVENTION

In view of the disadvantages and problems of the foregoing protective cover designs, the present invention provides an external rear view mirror protective cover which can solve the problem of lacking the universality.

In order to solve the above problems, embodiments of the present invention provide an external rear view mirror protective cover, which includes a main body made of elastic material. A trimmed edge folded towards the inside of the protective cover is provided at one end of the main body. The other end of the main body opposite to the trimmed edge is of an arc shape. The main body has a mirror surface opening for the rear view mirror, and the mirror surface opening is provided with a trimmed edge. Securing bands are disposed on the trimmed edge.

Preferably, the elastic material is nylon, lycra or latex.

Preferably, the shape of the mirror surface opening is rectangle or ellipse.

Preferably, the dimension of the trimmed edge at the opening may be larger than or equal to that of the opposite arc end.

Preferably, securing bands are provided on the trimmed edge.

The trimmed edge can be formed by overlocked stitches using an elastic thread.

The protective cover according to the present invention can be applied to external rear view mirrors of various types of vehicles due to its use of elastic material. The trimmed edge at the mirror opening of the protective cover prevents the protective cover from sliding off the external rear view mirror housing. The protective cover avoids the external rear view mirror from being damaged by the external scraping, collision and various accidents.

An embodiment is a rear view mirror protective cover, comprising a main body made of elastic material, wherein a trimmed edge folded towards the inside of the protective cover is provided at one end of the main body, the other end of the main body opposite to the trimmed edge is of an arc shape; the main body has a mirror surface opening for the rear view mirror, and the mirror surface opening is provided with a trimmed edge.

In an embodiment the elastic material is nylon, lycra or latex. In an embodiment the shape of the mirror surface opening is rectangle or ellipse. In an embodiment the securing bands are provided on the trimmed edge. In an embodiment the trimmed edge is formed by 3 to 5 needles overlocked stitches using an elastic thread.

An embodiment is an external rear view mirror protective cover, comprising a main body made of elastic material; wherein a first end of the main body comprises a trimmed edge configured to be folded towards an inside surface of the main body; a second end of the main body opposite the trimmed edge, wherein the second end is of an arc shape; a mirror surface opening of the main body, wherein the mirror surface opening is configured to receive the external rear view mirror therethrough; wherein the mirror surface opening comprises a trimmed edge; and a plurality of securing bands disposed on the trimmed edge.

In an embodiment the elastic material is nylon. In an embodiment the shape of the mirror surface opening is rectangular and alternately elliptical. In an embodiment the trimmed edge comprises overlocked stitches formed of an elastic thread. In an embodiment the elastic material is lycra. In an embodiment the elastic material is latex.

An embodiment is an external rear view mirror protective cover, comprising a main body made of elastic material; wherein a first end of the main body comprises a first trimmed edge configured to be folded towards an inside surface of the main body; a second end of the main body opposite said first trimmed edge, wherein the second end is of an arc shape; a mirror surface opening of the main body, wherein the mirror surface opening is configured to receive the external rear view mirror therethrough; wherein the mirror surface opening comprises a second trimmed edge; and at least one elastic band attached to said second trimmed edge runs across the surface of said external rear view mirror wherein said at least one elastic band is configured to allow an excessive portion of the protective cover which may otherwise cover a mirror surface to be drawn inside a gap between a mirror frame and a mirror housing.

In an embodiment said first trimmed edge and second trimmed edge comprise overlocked stitches formed of an elastic thread.

An embodiment is an external rear view mirror protective cover, comprising a main body made of elastic material; wherein a first end of the main body comprises a first trimmed edge configured to be folded towards an inside surface of the main body; a second end of the main body opposite said first trimmed edge, wherein the second end is of an arc shape; a mirror surface opening of the main body, wherein the mirror surface opening is configured to receive the external rear view mirror therethrough; wherein the mirror surface opening comprises a second trimmed edge; and one or more elastic bands attached to said second trimmed edge and extending therefrom and running across the mirror surface opening and attaching to another portion of said second trimmed edge wherein said one or more elastic bands are configured to allow an excessive portion of the protective cover which may otherwise cover a mirror surface to be drawn inside a gap between a mirror frame and a mirror housing.

In an embodiment the elastic material is spandex and elastane.

An embodiment of the invention is an external rear view mirror protective cover comprising a main body; wherein a first end of the main body comprises an opening, a first edge being provided at the opening; a mirror surface opening on the main body, wherein the mirror surface opening is configured to receive a mirror frame of an external rear view mirror therethrough; wherein a second edge is provided at the mirror surface opening; and one or more securing bands each attached to one portion of said second edge and extending therefrom and running across the mirror surface opening and attached to another portion of said second edge wherein said one or more securing bands are configured to pull said second edge inside a gap between the mirror frame and a mirror housing of the external rear view mirror to allow an excess portion of the protective cover which may otherwise cover a mirror surface to be drawn inside the gap between the mirror frame and the mirror housing.

In an embodiment the main body is made of an elastic material. In an embodiment the mirror surface opening is of an elliptical or rectangular shape. In an embodiment the first edge and second edge are trimmed by overlocked stitches formed of an elastic thread. In an embodiment the elastic material is one or more of nylon, latex, spandex, and elastane.

An embodiment is an external rear view mirror protective cover including a main body made of an elastic material and a trimmed edge arranged at one end of the main body that is folded towards an inside surface of main body. Another end of the main body opposite to the trimmed edge is in the shape of a circular arc. The main body includes a mirror opening, also formed with a trimmed edge, that is arranged to accommodate a rear view mirror. Securing bands are arranged on the trimmed edge. The elastic material is nylon, lycra or latex. The mirror opening is square or elliptic in shape. The protective cover is suitable for various kinds of rear view mirror due to its use of elastic material. The trimmed edge can effectively prevent the cover from sliding from the rear view mirror. The cover can effectively protect the external rear view mirror from external scuffing and damage caused by collision.

DETAILED DESCRIPTION

Hereinafter, the technical solutions of the present invention will be described in details by means of the preferred embodiment described below and in conjunction with the drawings.

Figure 1:
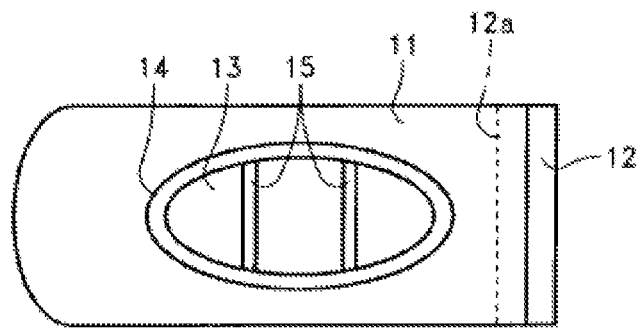
FIG. 1 is a front view of an embodiment.
Figure 3:
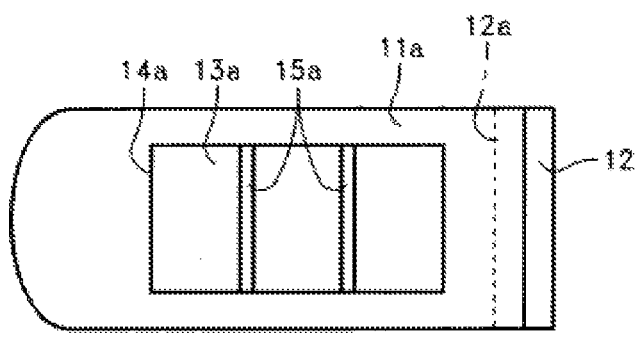
FIG. 3 is a front view of an alternate embodiment showing a rectangular shaped opening.
Figure 4:
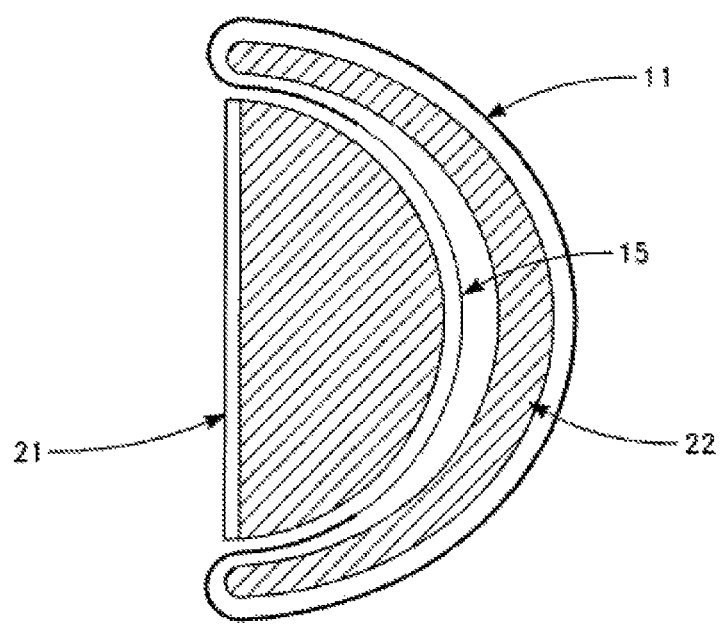
FIG. 4 is a side view of the device of the instant invention as it is shown folding back the fabric inside the casing of a rear view mirror.

Referring to FIG. 1, a main body 11 of the protective cover is formed of elastic material. The main body has a first end comprising a trimmed edge 12 configured to be folded towards an inside surface 12a of the main body and as seen in FIG. 3 wherein an alternate embodiment shows a rectangular shaped opening in the main body, the perimeter is denoted by 14a and the bands by 15a. FIG. 4 shows the cover of the instant invention mounted on a rear view car mirror. The reflective mirror 21 is exposed through the cover 11 as the elastic bands 15 secure the excess cover material in the mirror housing 22. A second end of the main body 11 of the protective cover is disposed opposite the trimmed edge. The second end has an arc shape so as to match the contour of a mirror housing of a vehicle's external rear view mirror. A mirror surface opening 13 is also provided on the main body 11. The mirror surface opening 13 also has a trimmed edge 14. The mirror opening 13 may have an elliptical shape and alternately a rectangular shape (See FIG. 3 wherein like features of FIG. 1 are designated with an "a" after the numeral) so as to match with the shape of the mirror surface of the external rear view mirror of a vehicle. The trimmed edges 12, 14 are formed of overlocked stitches formed of an elastic thread.

Figure 2:
FIG. 2 is a rear view of the embodiment.

Referring to FIG. 2, the front and rear parts of the main body 11 may be of an integral structure. Alternatively, the main body 11 may be composed of two separate front and rear parts that are seamed together.

The material of the protective cover may be a variety of elastic material, such as nylon, lycra, latex and the like.

As shown in FIG. 1, a plurality of securing bands 15 is provided on the trimmed edge 14. The number of the securing bands 15 may be two or more. Due to the elastic material of the protective cover, when the protective cover is mounted on the external rear view mirror, the trimmed edge 14 can be easily pulled inside a gap between a mirror frame and the mirror housing under the guiding of the securing bands 15, so as to make the main body 11 of the protective cover abut against the housing of the external rear view mirror closely. The two securing bands 15 on the trimmed edge 14 allow an excessive portion of the protective cover which may otherwise cover the mirror surface to be drawn inside the gap between the mirror frame and the mirror housing, which can solve the problem that the mirror surface is covered.

The protective cover according to the present invention may be applied to external rear view mirrors of various types of vehicles due to elastic material. The trimmed edge 12 at the mirror opening of the protective cover may effectively prevent the protective cover from sliding off the external rear view mirror. The protective cover may effectively avoid the external rear view mirror from being damaged by the external scraping, collision and various accidents. A propagandistic design may also be printed on the protective cover, so that the external rear view mirror of vehicle may become a platform for displaying messages and graphics.

Any modification, equivalent, improvement and the like made to the external rear view mirror protective cover according to the embodiment of the invention within the sprits and principles of the present invention should be deemed to fall into the protection scope of the present invention.

What is claimed is:
1. An external rear view mirror protective cover comprising:
   a main body;
   wherein a first end of the main body comprises an opening, a first edge being provided at the opening;

a mirror surface opening on the main body, wherein the mirror surface opening is configured to receive a mirror frame of an external rear view mirror therethrough;

wherein a second edge is provided at the mirror surface opening, the second edge having a position fitting inside a gap between the mirror frame and a mirror housing of the external rear view mirror; and one or more elastic securing bands each attached to one portion of said second edge and extending therefrom and running across the mirror surface opening and attached to another portion of said second edge wherein said one or more elastic securing bands, in said position, fitting inside the gap between the mirror frame and the mirror housing and further configured to pull said second edge inside the gap between the mirror frame and the mirror housing in order to allow an excess portion of the protective cover which may otherwise cover a mirror surface to be drawn inside the gap between the mirror frame and the mirror housing.

2. The external rear view mirror protective cover according to claim 1 wherein the main body is made of an elastic material.

3. The external rear view mirror protective cover according to claim 1 wherein the mirror surface opening is of an elliptical or rectangular shape.

4. The external rear view mirror protective cover according to claim 1 wherein said first edge and second edge are trimmed by overlocked stitches formed of an elastic thread.

5. The external rear view mirror protective cover according to claim 2 wherein the elastic material is one or more of nylon, latex, spandex, and elastane.

* * * * *